US011671777B2

(12) United States Patent
Young et al.

(10) Patent No.: US 11,671,777 B2
(45) Date of Patent: Jun. 6, 2023

(54) SENSOR MANAGEMENT FOR WIRELESS DEVICES

(71) Applicant: Bose Corporation, Framingham, MA (US)

(72) Inventors: Douglas Warren Young, Arlington, MA (US); Nathan A. Blagrove, Wayland, MA (US); Rasmus Abildgren, Skørping (DK); Casper Stork Bonde, Støvring (DK); Alaganandan Ganeshkumar, North Attleboro, MA (US)

(73) Assignee: Bose Corporation, Framingham, MA (US)

( * ) Notice: Subject to any disclaimer, the term of this patent is extended or adjusted under 35 U.S.C. 154(b) by 80 days.

(21) Appl. No.: 17/126,630

(22) Filed: Dec. 18, 2020

(65) Prior Publication Data
US 2022/0201416 A1 Jun. 23, 2022

(51) Int. Cl.
H04R 29/00 (2006.01)
H04W 4/38 (2018.01)
(Continued)

(52) U.S. Cl.
CPC ............ *H04R 29/005* (2013.01); *G10L 25/21* (2013.01); *G10L 25/51* (2013.01); *G10L 25/78* (2013.01);
(Continued)

(58) Field of Classification Search
CPC ...... H04R 1/10; H04R 1/1008; H04R 1/1041; H04R 1/105; H04R 1/1066; H04R 1/1075;
(Continued)

(56) References Cited

U.S. PATENT DOCUMENTS 9,532,131 B2 * 12/2016 Dusan .................. G10K 11/178
10,477,294 B1    11/2019 Jorgovanovic et al.
(Continued)

FOREIGN PATENT DOCUMENTS

CN        111741401 A        10/2020

OTHER PUBLICATIONS

Woolley, Martin. Bluetooth Core Specification Version 5.2. Feature Summary [online]. Jan. 6, 2020 [retrieved on Jul. 13, 2020]. Retrieved from the Internet: <URL: https://www.bluetooth.com/bluetooth-resources/bluetooth-core-specification-version-5-2-feature-overview/>.

(Continued)

*Primary Examiner* — Lun-See Lao
(74) *Attorney, Agent, or Firm* — Bond, Schoeneck & King, PLLC

(57) ABSTRACT

A system and method for selecting audio capture sensors of wearable devices in obtaining voice data. The method provides obtaining signals associated with the user's voice at first and second wearable devices, comparing energy levels of the first and second signals, and selecting one or more audio capture sensors based on the energy levels of each signal. Due to the symmetry of the acoustic energy produced by the user's voice to a first and second wearable device, any difference in energy level between the total energy obtained by the first wearable device and the total energy obtained by the second wearable device can be attributed solely to ambient noise. Thus, the device with the higher total energy has a lower signal-to-noise ratio and selection of an audio capture sensor of the other wearable device with a higher signal-to-noise ratio is provided to obtain voice data moving forward.

24 Claims, 5 Drawing Sheets

(51) Int. Cl.
*H04W 76/14* (2018.01)
*G10L 25/21* (2013.01)
*G10L 25/51* (2013.01)
*G10L 25/78* (2013.01)
*H04R 1/40* (2006.01)
*H04R 3/00* (2006.01)

(52) U.S. Cl.
CPC ............. *H04R 1/406* (2013.01); *H04R 3/005* (2013.01); *H04W 4/38* (2018.02); *H04W 76/14* (2018.02)

(58) Field of Classification Search
CPC ........... H04R 2420/07; H04R 2499/11; H04R 5/033; H04R 5/0335; H04W 24/00; H04W 4/00; H04W 4/021; H04W 64/003
USPC ................. 381/1–3, 56–58, 312; 700/94
See application file for complete search history.

(56) References Cited

U.S. PATENT DOCUMENTS

| | | | |
|---|---|---|---|
| 10,674,290 B2* | 6/2020 | Ungstrup | H04M 1/72475 |
| 11,197,142 B1* | 12/2021 | Kontopidis | H04R 1/10 |
| 11,205,437 B1* | 12/2021 | Zhang | G10L 21/0232 |
| 2003/0005197 A1* | 1/2003 | Abramson | G06F 13/387 |
| | | | 710/300 |
| 2015/0078575 A1* | 3/2015 | Selig | H04R 1/1025 |
| | | | 381/74 |
| 2017/0064433 A1* | 3/2017 | Hirsch | H04R 1/028 |
| 2018/0124491 A1* | 5/2018 | Dragicevic | H04R 1/08 |
| 2018/0146310 A1* | 5/2018 | Bazzoni | G16H 40/40 |
| 2018/0270565 A1* | 9/2018 | Ganeshkumar | G10L 25/84 |

OTHER PUBLICATIONS

International Search Report and Written Opinion of the International Searching Authority, International Patent Application No. PCT/US2021/072285, pp. 1-11, dated Feb. 7, 2022.

* cited by examiner

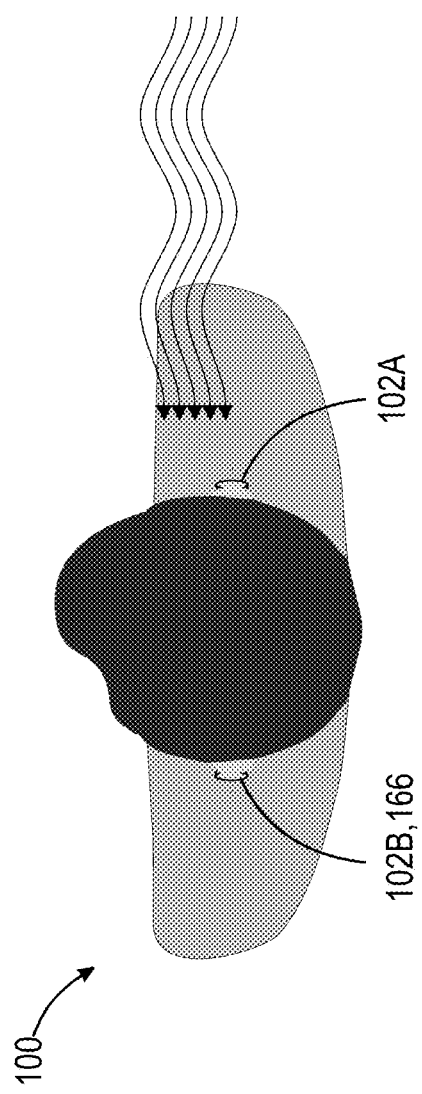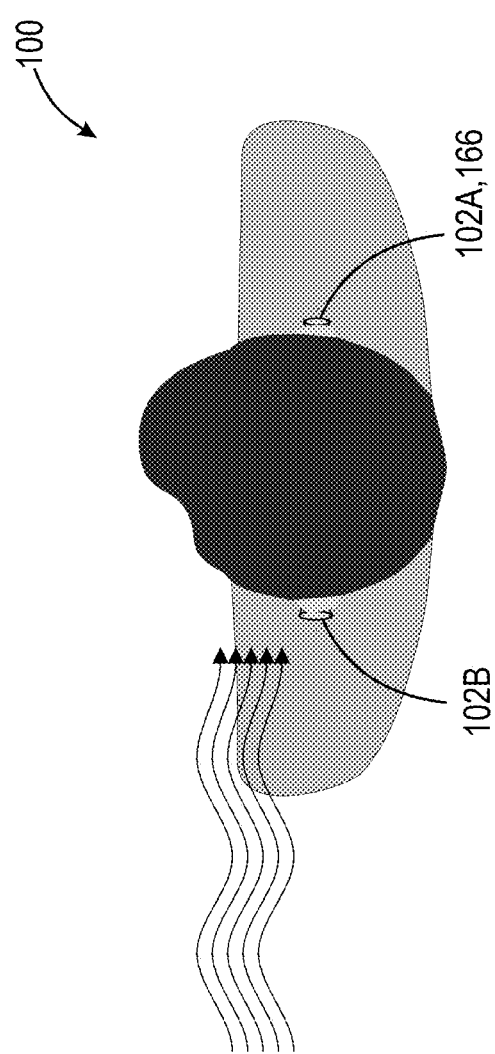

SENSOR MANAGEMENT FOR WIRELESS DEVICES

BACKGROUND

Aspects and implementations of the present disclosure are generally directed to systems and methods for managing sensor data, for example, managing the capture of voice data from one or more audio capture sensors between wearable devices.

Wearable wireless audio devices, e.g., wireless headphones, often utilize paired connections to stream wireless audio data from a source device. Typically, each wireless headphone receives a discrete stream of data specific to each wireless headphone, e.g., the source device produces one stream of data associated with the left headphone and one stream associated with the right headphone. In some circumstances, each headphone may also utilize one or more microphones to obtain a signal corresponding to a user's voice, e.g., when the user is engaged in a telephone conversation where the headphones (via a Bluetooth connection) act as both the receiver and transmitter for the conversation. In some examples, only one headphone of the pair of headphones is used to obtain the signals corresponding to the user's voice.

Additionally, at various times, the environment surrounding the user may produce excessive ambient noise cause by, for example, wind, traffic, machinery, etc. If the user is oriented such that the one of the headphones, e.g., the headphone responsible for obtaining the signals corresponding to the users voice, is closer to the source of the ambient noise, e.g., in the direct path of wind, the quality of the voice pickup of that headphone will suffer.

SUMMARY OF THE DISCLOSURE

The present disclosure relates to systems and methods and computer program products for selecting one or more audio capture sensors of wearable devices for use in obtaining voice data. The examples provided include obtaining signals associated with the user's voice at a first and a second wearable device (where the first wearable device is positioned in the user's right ear and the second wearable device is positioned in the user's left ear), comparing energy levels of the first and second signals, and selecting one or more audio capture sensors based on the energy levels of each signal. Due to the symmetry of the acoustic energy produced by the user's voice to a first and second wearable device (as the device in the user's right ear is equally distant from the device in the user's left ear), any difference in energy level between the total energy obtained by the first wearable device and the total energy obtained by the second wearable device can be attributed solely to a difference in ambient noise. Thus, the device with the higher total energy has a lower signal-to-noise ratio and selection of one or more audio capture sensors of the other wearable device with the higher signal-to-noise ratio is preferred to obtain voice data moving forward.

In some examples, the systems and methods discussed herein utilize wireless data transmission, specifically, wireless topologies for broadcasting and transmitting audio streams between devices. For example, Core Specification 5.2 ("The Core Specification") released by the Bluetooth Special Interest Group (SIG) on Jan. 6, 2020, defines new features related to Bluetooth Low Energy (BLE) topologies. One feature described in the 5.2 Core Specification is Broadcast Isochronous Streams which utilize connectionless isochronous communications. A similar feature described by the 5.2 Core Specification is an LE Connected Isochronous Stream, which utilizes connection-oriented isochronous channels to provide a point-to-point isochronous communication stream between two devices, e.g., between peripheral device 104 and wearable devices 102A and 102B (discussed below). In one example, the systems, devices, and methods discussed herein utilize Bluetooth Low-Energy audio topologies enabled by the 5.2 Core Specification (referred to herein as "LE Audio"). For example, LE Audio enables unicast wireless topologies (referred to as "connected isochronous streams") that allow a single Bluetooth audio source device (e.g., a smart phone) to transmit multiple audio streams to separate Bluetooth devices at the same time, e.g., wireless headphones. These topologies are intended to improve Bluetooth operation for wireless headphones.

Specifically, when using wireless headphone or wireless wearable device (discussed below) algorithms can be used to improve voice pickup using inputs from multiple microphones on wearable devices. Some of these algorithms minimize ambient noise, e.g., wind noise, by reducing gain on microphones which are directly in the path of wind. Other algorithms use binaural beamforming (using microphones placed close to both left and right ears) to maximize signal-to-noise ratio. Many of these algorithms cannot be realized on truly wireless earbud form factors because of the high latency between the earbuds. These truly wireless earbuds generally use Bluetooth to transmit data between earbuds and it can take up to 100 ms to transfer microphone data reliably between earbuds. This exceeds the acceptable latency that some voice pickup algorithms can tolerate.

In this disclosure, sensor inputs (e.g., microphone inputs) are monitored on both left and right wearable devices to determine which set of sensors provides an optimal signal-to-noise ratio. In some examples which use classic Bluetooth connections, the "master" earbud (which maintains the Bluetooth connection to the peripheral device) is the device that is configured to send microphone audio data to the peripheral device (e.g., a smart phone) during a voice interaction. If, through a communication data link between the two earbuds, it is determined that ambient noise, such as wind noise, is high in the master bud but low in the puppet bud, the two buds can initiate a role switch mid-stream. In some examples, the systems and method utilize one or more classic Bluetooth chip solutions which enabling "seamless" role switching on a classic Bluetooth connection that could enable this to role switch. This allows the master bud to hand off responsibility for maintaining the Bluetooth connection to the smartphone to the puppet bud, enabling the puppet bud to use its microphones (with lower wind noise) for voice pickup instead of the master bud's microphones. To do so without a role switch would require the puppet's microphone audio to be sent over Bluetooth to the master bud and then forwarded to the phone, which would produce unacceptably high latency for real time voice conversations.

A similar scheme can be employed for LE audio connections. In LE audio, each bud may be synchronized to a separate Connected Isochronous Stream (CIS) which are part of the same Connected Isochronous Group (CIG). Each bud could have knowledge of the other bud's CIS either by monitoring connection setup of the CIS for the other bud or by exchanging information via a communication data link between buds. When used for a phone call, for instance, one of the two buds may transmit microphone audio to a negotiated CIS sent to the phone. Upon detecting significant ambient noise, e.g., wind noise, on that microphone audio stream, the bud could do a handshake with the other bud and "hand off" responsibility for sending microphone audio to the other bud. This would allow the second bud to send its microphone data to the phone (with less wind noise) without the phone knowing that a switch had been made.

In both classic Bluetooth and LE audio implementations, automatic gain control parameters for each microphone could be exchanged over the communication data link between the buds before making the role switch between microphones, to prevent users from noticing a difference in microphone gain when microphones are switched.

LE audio capability could be leveraged in additional ways to improve voice pickup for truly wireless buds. In one implementation, raw (unprocessed) audio data from one or two microphones could be sent from each bud to a receiving device (like a phone). The phone could receive audio from all microphones and then apply beamforming or other voice pickup algorithms on the raw audio data. This could be done in one or more applications or could utilize a voice algorithm "plugin" to other 3rd party VOIP apps. In other implementations, one or more of these algorithms could be integrated into VPA apps or be integrated into cloud services. The algorithms could be tuned optimally for different devices and could be selected by a mobile app or cloud services based on identifying information from the device. Performing voice processing on the phone or cloud side enables multi-mic voice algorithms to be deployed using microphones from both sides of the head, which is much more difficult to accomplish for truly wireless buds due to delays in audio transmission from bud to bud.

In other implementations, to save Bluetooth bandwidth, each bud could do local beamforming of two microphones and only send a single channel of voice audio to the phone. The phone or cloud can then run algorithms (in a similar manner mentioned above) to processed beamformed audio from each bud and combine them to produce improved voice pickup/signal-to-noise ration of the audio signal.

In another implementation, an active noise reduction (ANR) feedback microphone (facing towards the user's ear) could be used to capture voice from one earbud in windy conditions, while on the other bud an externally facing microphone could be used for voice capture. The ANR feedback microphone, while more immune to wind noise (or other high noise environments like babble noise), is not able to pick up a lot of high frequency content. The externally facing microphone in the other bud, when mixed with voice audio from the ANR feedback microphone from the first earbud, enables the bandwidth of the voice capture to be extended while minimizing wind noise. As wind conditions change dynamically, the buds could coordinate swapping which bud uses an ANR feedback microphone to capture voice and which one uses an externally facing microphone.

Both buds could also capture voice using ANR feedback and externally facing microphones simultaneously and compress the microphone audio and send multiple microphone channels to the source device, where mixing could be done. Algorithms running on the source device could then dynamically select which microphones are used for mixing, based on the environmental noise picked up by externally facing microphones in each bud. Any voice algorithm running independently on each side can also send key information (e.g., through metadata) to the source device which then uses that information to decide which microphones to utilize for mixing (mics from one bud or another or a mix of both). Non-standard codecs could also be used for mic audio transmission that have lower encoding/decoding algorithmic delay or higher compression as appropriate for a given use case.

In other use cases, the output of the aforementioned microphone mixing scheme can be used to make decisions regarding the volume level or ANR settings of the product. For instance, based on the noise levels detected by the microphone mixing algorithms running on the source device, a signal could be sent back to the product telling it to adjust the volume level to compensate for environmental noise. Similarly, information about environmental noise could be sent as a signal back to the product in order to automatically adjust ANR levels.

In one example, a method for selecting one or more audio capture sensors of wearable devices is provided, the method including: detecting a first signal corresponding with a user's voice using at least one audio capture sensor of a first wearable device; detecting a second signal corresponding with the user's voice using at least one audio capture sensor of a second wearable device, wherein the second wearable device is wirelessly connected to the first wearable device; determining an energy level of the first signal; determining an energy level of the second signal; and selecting, based at least in part on the energy level of the first signal and the energy level of the second signal, at least one audio capture sensor of the first wearable device and/or at least one audio capture sensor of the second wearable device to obtain voice data.

In one aspect, the first wearable device is configured to send the first signal to a peripheral device and the second wearable device is configured to send the second signal to a peripheral device, and wherein the peripheral device is configured to compare the energy level of the first signal with the energy level of the second signal for the selecting of the at least one audio capture sensor of the first wearable device and/or the at least one audio capture sensor of the second wearable device to obtain voice data.

In one aspect, the at least one audio capture sensor of the first wearable device comprises a first set of multiple audio capture sensors, and wherein the first signal is an average energy level of the first multiple audio capture sensors, and wherein the first wearable device is configured to send the first signal to the peripheral device using a compression algorithm.

In one aspect, the first wearable device is further configured to send metadata to the first peripheral device for use with a mixing algorithm executed by the peripheral device.

In one aspect, the mixing algorithm is arranged to generate an output, and wherein the peripheral device is configured to send the output to the first wearable device, wherein the first wearable audio device is configured to use the output to automatically change a volume level or an active noise reduction (ANR) setting.

In one aspect, the second wearable device is configured to send the second signal to the first wearable device, and wherein the first wearable device is configured to compare the energy level of the first signal with the energy level of the second signal for the selecting of the at least one audio capture sensor of the first wearable device and/or the at least one audio capture sensor of the second wearable device to obtain voice data.

In one aspect, the energy levels of the first and second signals relate to at least one of signal-to-noise ratio (SNR), wind presence, radio frequency (RF) performance, or audio pickup.

In one aspect, the at least one audio capture sensor of the first wearable device and the at least one audio capture sensor of the second wearable device are selected from at least one of an exterior microphone, an interior microphone, a feedback microphone that is also used for acoustic noise reduction (ANR) purposes, a feedforward microphone that is also used for ANR purposes, or an accelerometer.

In one aspect, the at least one audio capture sensor of the first wearable device includes a first set of multiple audio capture sensors, and wherein the selecting of the at least one audio capture sensor includes dynamically changing between selection of a first audio capture sensor of the first set of multiple audio capture sensors and a second audio capture sensor of the first set of multiple audio capture sensors.

In one aspect, the at least one audio capture sensor of the first wearable device includes a first set of multiple audio capture sensors, and wherein the energy level of the first signal is an average energy level of the first set of multiple audio capture sensors.

In one aspect, the at least one audio capture sensor of the second wearable device includes a second set of multiple audio capture sensors, and wherein the energy level of the second signal is an average energy level of the second set of multiple audio capture sensors.

In one aspect, when the energy level of the first signal is less than the energy level of the second signal, only the at least one audio capture sensor of the first wearable device is selected to obtain voice data and not the at least one audio capture sensor of the second wearable device.

In one aspect the voice data is sent to a peripheral device using a negotiated connected isochronous stream.

In one aspect, when the selecting causes a change from using the at least one audio capture sensor of the first wearable device to obtain voice data to using the at least one audio capture sensor of the second wearable device to obtain voice data, the first wearable device performs a handshake with the second wearable device to shift responsibility to obtain voice data to the at least one audio capture sensor of the second wearable device.

In one aspect, when the selecting causes a change from using the at least one audio capture sensor of the first wearable device to obtain voice data to using the at least one audio capture sensor of the second wearable device to obtain voice data, a gain parameter associated with the at least one audio capture sensor of the first wearable device is shared with the second wearable device to be applied to the at least one audio capture sensor of the second wearable device.

In another example, a computer program product for selecting one or more audio capture sensors of wearable devices is provided, the computer program product including a set of non-transitory computer readable instructions that when executed on at least one processor of a first wearable device, a second wearable device, or a peripheral device, the processor is configured to: detect or receive a first signal corresponding with a user's voice captured by at least one audio capture sensor of the first wearable device; detect or receive a second signal corresponding with the user's voice captured by at least one audio capture sensor of the second wearable device, wherein the second wearable device is wirelessly connected to the first wearable device; determine an energy level of the first signal; determine an energy level of the second signal; and select, based at least in part on the energy level of the first signal and the energy level of the second signal, at least one audio capture sensor of the first wearable device or at least one audio capture sensor of the second wearable device to obtain voice data.

In one aspect, the first wearable device is configured to send the first signal to the peripheral device and the second wearable device is configured to send the second signal to the peripheral device, and wherein the peripheral device is configured to compare the energy level of the first signal with the energy level of the second signal for selecting of the at least one audio capture sensor of the first wearable device or the at least one audio capture sensor of the second wearable device to obtain voice data.

In one aspect, the second wearable device is configured to send the second signal to the first wearable device, and wherein the first wearable device is configured to compare the energy level of the first signal with the energy level of the second signal for the selecting of the at least one audio capture sensor of the first wearable device or the at least one audio capture sensor of the second wearable device to obtain voice data.

In one aspect, the energy levels of the first and second signals related to at least one of signal-to-noise ratio (SNR), wind presence, radio frequency (RF) performance, or audio pickup.

In one aspect, the at least one audio capture sensor of the first wearable device and the at least one audio capture sensor of the second wearable device are selected from at least one of: an exterior microphone, an interior microphone, a feedback microphone that is also used for acoustic noise reduction (ANR) purposes, a feedforward microphone that is also used for ANR purposes, or an accelerometer.

In one aspect, the at least one audio capture sensor of the first wireless worn device includes a first set of multiple audio capture sensors and wherein the energy level of the first signal is an average energy level of the first set of multiple audio capture sensors; and the at least one audio capture sensor of the second wearable device includes a second set of multiple audio capture sensors, and wherein the energy level of the second signal is an average energy level of the second set of audio capture sensors.

In one aspect, when the energy level of the first signal is less than the energy level of the second signal, only the at least one audio capture sensor of the first wearable device is selected to obtain voice data and not the at least one audio capture sensor of the second wearable device.

In one aspect, the selecting causes a change from using the at least one audio capture sensor of the first wearable device to obtain voice data to using the at least one audio capture sensor of the second wearable device to obtain voice data, the first wearable device performs a handshake with the second wearable device to shift responsibility to obtain voice data to the at least one audio capture sensor of the second wearable device.

In one aspect, the selecting causes a change from using the at least one audio capture sensor of the first wearable device to obtain voice data to using the at least one audio capture sensor of the second wearable device to obtain voice data, a gain parameter associated with the at least one audio capture sensor of the first wearable device is shared with the second wearable device to be applied to the at least one audio capture sensor of the second wearable device.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

FIG. 4A is a schematic top view of a system according to the present disclosure.

FIG. 4B is a schematic top view of a system according to the present disclosure.

DETAILED DESCRIPTION OF EMBODIMENTS

The present disclosure relates to systems and methods and computer program products for selecting one or more audio capture sensors of wearable devices for use in obtaining voice data. The examples provided include obtaining signals associated with the user's voice at a first and a second wearable device (where the first wearable device is positioned in the user's right ear and the second wearable device is positioned in the user's left ear), comparing energy levels of the first and second signals, and selecting one or more audio capture sensors based on the energy levels of each signal. Due to the symmetry of the acoustic energy produced by the user's voice to a first and second wearable device (as the device in the user's right ear is equally distant from the device in the user's left ear), any difference in energy level between the total energy obtained by the first wearable device and the total energy obtained by the second wearable device can be attributed solely to a difference in ambient noise. Thus, the device with the higher total energy has a lower signal-to-noise ratio and selection of one or more audio capture sensors of the other wearable device with the higher signal-to-noise ratio is preferred to obtain voice data moving forward.

Figure 1:
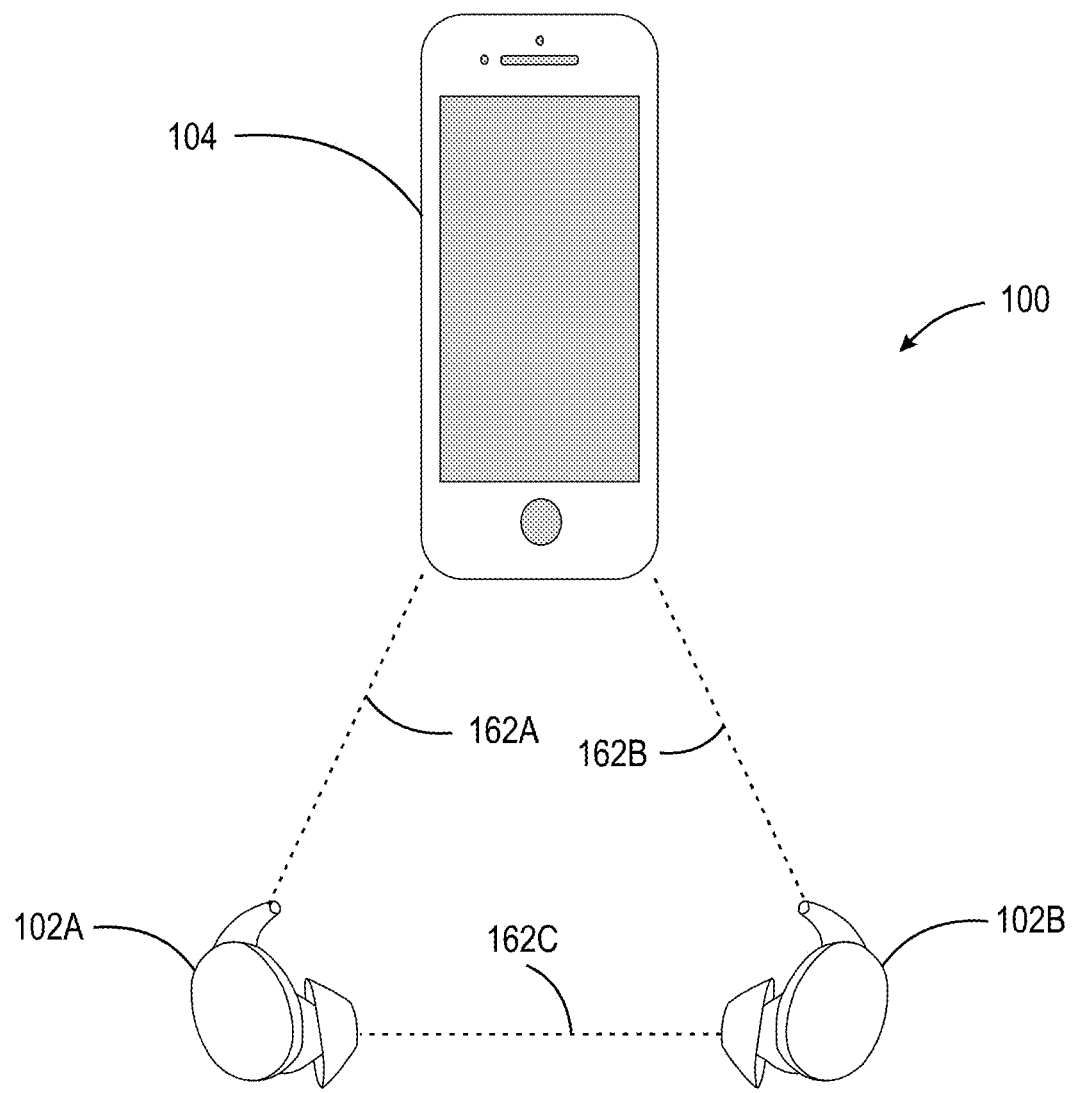
FIG. 1 is a schematic view of a system according to the present disclosure.

The term "wearable audio device", as used in this application, in addition to including its ordinary meaning or its meaning known to those skilled in the art, is intended to mean a device that fits around, on, in, or near an ear (including open-ear audio devices worn on the head or shoulders of a user) and that radiates acoustic energy into or towards the ear. Wearable audio devices are sometimes referred to as headphones, earphones, earpieces, headsets, earbuds or sport headphones, and can be wired or wireless. A wearable audio device includes an acoustic driver to transduce audio signals to acoustic energy. The acoustic driver can be housed in an earcup. While some of the figures and descriptions following can show a single wearable audio device, having a pair of earcups (each including an acoustic driver) it should be appreciated that a wearable audio device can be a single stand-alone unit having only one earcup. Each earcup of the wearable audio device can be connected mechanically to another earcup or headphone, for example by a headband and/or by leads that conduct audio signals to an acoustic driver in the ear cup or headphone. A wearable audio device can include components for wirelessly receiving audio signals. A wearable audio device can include components of an active noise reduction (ANR) system. Wearable audio devices can also include other functionality such as a microphone so that they can function as a headset. While FIG. 1 shows an example of an in-the-ear headphone form factor, in other examples the wearable audio device can be an on-ear, around-ear, behind-ear, over-the-ear or near-ear headset, or can be an audio eyeglasses form factor headset. In some examples, the wearable audio device can be an open-ear device that includes an acoustic driver to radiate acoustic energy towards the ear while leaving the ear open to its environment and surroundings.

The term "connected isochronous stream" as used herein, in addition to including its ordinary meaning or its meaning known to those skilled in the art, is intended to refer to an isochronous data stream which utilizes a preestablished, point-to-point communication link over LE Audio between, e.g., a source device and an audio device or a plurality of audio devices. In other words, a connected isochronous stream can provide an isochronous audio stream which utilizes at least one established reliable communication channel and/or at least one acknowledged communication channel between the source device and any respective audio devices.

The term "broadcast isochronous stream" as used herein, in addition to including its ordinary meaning or its meaning known to those skilled in the art, is intended to refer to an isochronous data stream which does not require a preestablished communications link to be established between the source device sending data and the audio device receiving data and does not require acknowledgements or negative acknowledgements to be sent or received.

The following description should be read in view of FIGS. 1-4B. FIG. 1 is a schematic view of system 100 according to the present disclosure. System 100 includes a plurality of wearable devices, e.g., first wearable device 102A and second wearable device 102B (collectively referred to herein as "wearable devices 102") and a peripheral device 104. In the examples illustrated, first wearable device 102A and second wearable device 102B are intended to be a pair of wearable audio devices, e.g., a pair of truly wireless earbuds, where first wearable device 102A and second wearable device 102B are arranged to be secured proximate to or within a user's right and left ears, respectively. However, in some alternative examples, it should be appreciated that first wearable device 102A and second wearable device 102B can be selected from at least one of: hearing aids, speakers, portable speakers, paired speakers or paired portable speakers. As illustrated, system 100 includes a peripheral device 104, e.g., a smartphone or tablet, configured to establish wireless data connections with wearable devices 102, which is discussed below in detail.

Figures 2A, 2B:
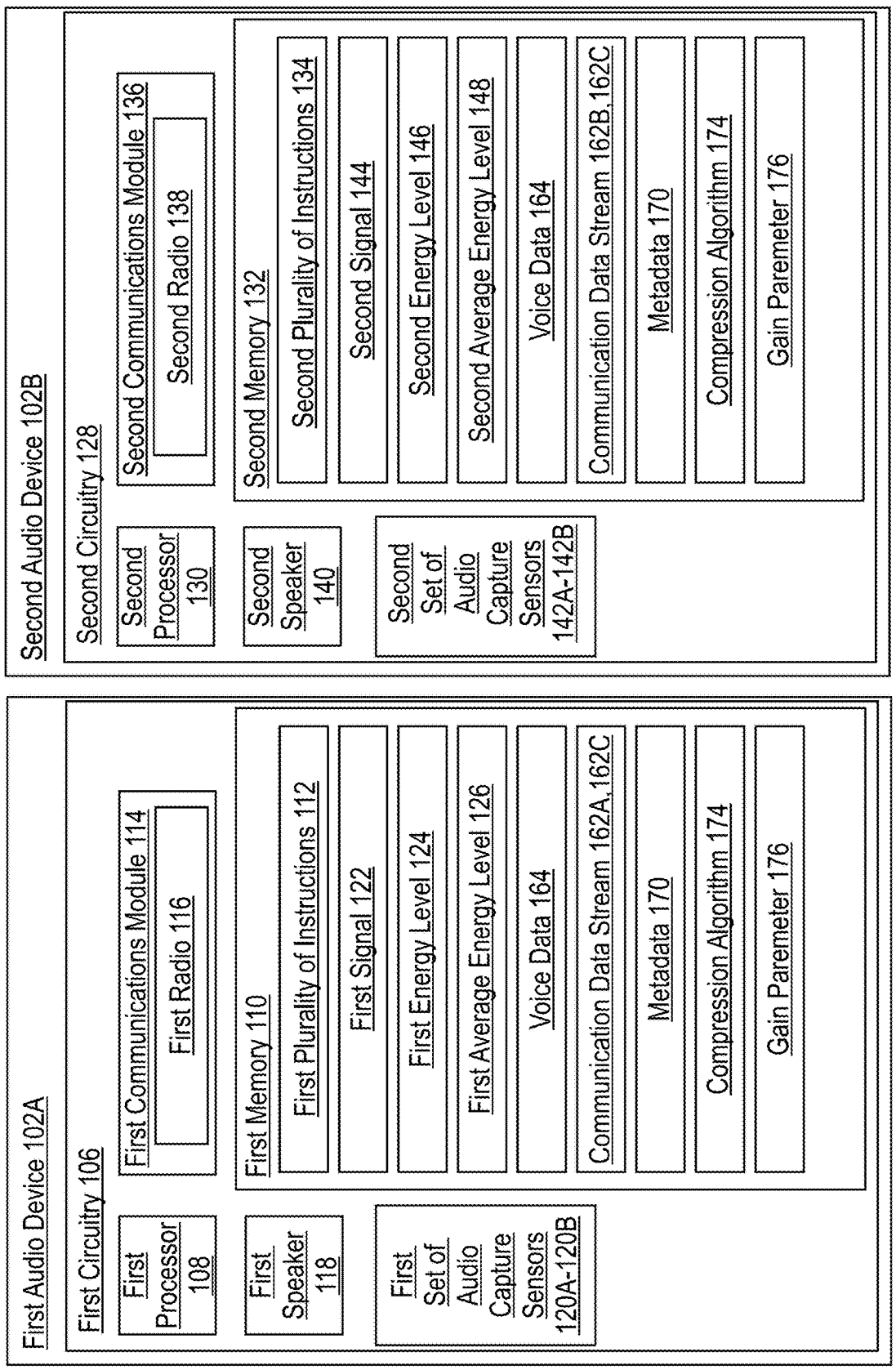
FIG. 2A is a schematic view of the components of a first wearable device according to the present disclosure.
FIG. 2B is a schematic view of the components of a second wearable device according to the present disclosure.

As illustrated in FIG. 2A first wearable device 102A comprises first circuitry 106. First circuitry 106 includes first processor 108 and first memory 110 configured to execute and store, respectively, a first plurality of non-transitory computer-readable instructions 112, to perform the various functions of first wearable device 102A and first circuitry 106 as will be described herein. First circuitry 106 also includes a first communications module 114 configured to send and/or receive wireless data, e.g., data relating to at least one of the plurality of communication data streams discussed below, e.g., communication data stream 162A. To that end, first communications module 114 can include at least one radio or antenna, e.g., a first radio 116 capable of sending and receiving wireless data. In some examples, first communications module 114 can include, in addition to at least one radio (e.g., first radio 116), some form of automated gain control (AGC), a modulator and/or demodulator, and potentially a discrete processor for bit-processing that are electrically connected to first processor 108 and first memory 110 to aid in sending and/or receiving wireless data. As will be discussed below, first circuitry 106 of first wearable device 102A can also include a first speaker 118, e.g., a loudspeaker or acoustic transducer, that is electrically connected to first processor 108 and first memory 110 and configured to electromechanically convert an electrical signal into audible acoustic energy within environment E, e.g., an audio playback. In some examples, the electrical signal and the audible acoustic energy are associated with the data included in the plurality of communication data streams (discussed below).

First wearable device 102A can further include a first set of audio capture sensors 120. In some examples, the first set of audio capture sensors includes only one audio capture sensor. In some examples, the first set of audio capture sensors 120 includes multiple audio capture sensors, e.g., a first audio capture sensor 120A and a second audio capture sensor 120B (collectively referred to as "first set of audio capture sensors 120"). In other examples, the first set of audio captures sensors 120 can have more than two audio capture sensors, e.g., the set can include 3, 4, 5, or more audio capture sensors. Each audio capture sensor of the first set of audio capture sensors 120 is intended to be a microphone or some other audio capture device (e.g., a unidirectional or directional micro-electro-mechanical system (MEMS) microphone arranged on, in, or in proximity to the first wearable device 102A). It should be appreciated that each audio capture sensor 120 can be configured as: an external microphone (e.g., a microphone positioned to pickup or obtain sound energy outside of the air cavity created between the wearable audio device 102A and the user's eardrum); an internal microphone (e.g., a microphone positioned to pickup or obtain sound energy inside of the air cavity created between the wearable audio device 102A and the user's eardrum); or an accelerometer. In some examples, the exterior microphone can be a feedforward microphone also used to obtain or pickup external sound energy used in active noise reduction (ANR) applications. In other examples, the internal microphone can be a feedback microphone also used to obtain or pickup internal sound energy used in ANR applications. It should be appreciated that each audio capture sensor can be configured to obtain or pick up sound energy via air conduction and/or via bone conduction (through one or more bones of the user's body, e.g., the user's head or jaw). It should also be appreciated that two or more audio capture sensors of the first set of audio capture sensors 120 can be arranged such that beamforming techniques, using one or more algorithms, can be utilized to enhance the quality of the audio pickup obtained by the audio capture sensors, e.g., to enhance the quality of voice data 164 (discussed below). In some implementations, multiple of the same type of audio capture sensor are included on a wearable device, such as where there are two external facing microphones for audio capture sensors 120A and 120B on first wearable device 102A. In some implementations, a mix of different types of audio capture sensors are in included on a wearable device, such as where first audio capture sensor 120A is an external facing microphone and second audio capture sensor 120B is an accelerometer.

As will be discussed below, each audio capture sensor of the first set of audio capture sensors 120 is configured to obtain sound energy from the environment surrounding the user and convert that sound energy into an electronic signal, i.e., first signal 122. Once obtained, first signal 122 can be analyzed to determine a first energy level 124. First energy level 124 is intended to be a measure of the total acoustic energy detected one or more audio capture sensors 120. This total acoustic energy can include acoustic energy generated by the user, e.g., the user's voice, as well as other ambient acoustic energy from the surrounding environment, e.g., wind, conversations, traffic noise, machinery, etc. In some examples where the first set of audio capture sensors 120 includes two or more audio capture sensors, as described above, first energy level 124, can be an average energy level, i.e., first average energy level 126, obtained or picked up by all of the audio capture sensors of the first set of audio capture sensors 120. For example, one or more external microphone signals may be averaged together to form first energy level 124. In another example, one or more internal microphone signals may be averaged with one or more external microphones to form first energy level 124.

As illustrated in FIG. 2B, second wearable device 102B comprises second circuitry 128. Second circuitry 128 includes second processor 130 and second memory 132 configured to execute and store, respectively, a second plurality of non-transitory computer-readable instructions 134, to perform the various functions of second wearable device 102B and second circuitry 128 as will be described herein. Second circuitry 128 also includes a second communications module 136 configured to send and/or receive wireless data, e.g., data relating to the plurality of data streams discussed below, e.g., isochronous data stream 162B. To that end, second communications module 136 can include at least one radio or antenna, e.g., a second radio 138 capable of sending and receiving wireless data. In some examples, second communications module 128 can include, in addition to at least one radio (e.g., first radio 138), some form of automated gain control (AGC), a modulator and/or demodulator, and potentially a discrete processor for bit-processing that are electrically connected to second processor 130 and second memory 132 to aid in sending and/or receiving wireless data. As will be discussed below, second circuitry 128 of second wearable device 102B can also include a second speaker 140, e.g., a loudspeaker or acoustic transducer, that is electrically connected to second processor 130 and second memory 132 and configured to electromechanically convert an electrical signal into audible acoustic energy within environment E, e.g., an audio playback. In some examples, the electrical signal and the audible acoustic energy are associated with the data included in the plurality of data streams (discussed below).

Second wearable device 102B can further include a second set of audio capture sensors 142. In some examples, the second set of audio capture sensors includes only one audio capture sensor. In some examples, the second set of audio capture sensors 142 includes multiple audio capture sensors, e.g., a first audio capture sensor 142A and a second audio capture sensor 142B (collectively referred to as "second set of audio capture sensors 142"). In other examples, the second set of audio captures sensors 142 can have more than two audio capture sensors, e.g., the set can include 3, 4, 5, or more audio capture sensors. Each audio capture sensor of the second set of audio capture sensors 142 is intended to be a microphone, or some other audio capture device (e.g., a unidirectional or directional micro-electro-mechanical system (MEMS) microphone arranged on, in, or in proximity to the second wearable device 102B). It should be appreciated that each audio capture sensor 142 can be configured as: an external microphone (e.g., a microphone positioned to pickup or obtain sound energy outside of the air cavity created between the wearable audio device 102B and the user's eardrum); an internal microphone (e.g., a microphone positioned to pickup or obtain sound energy inside of the air cavity created between the wearable audio device 102B and the user's eardrum); or an accelerometer. In some examples, the exterior microphone can be a feedforward microphone also used to obtain or pickup external sound energy used in active noise reduction (ANR) applications. In other examples, the internal microphone can be a feedback microphone also used to obtain or pickup internal sound energy used in ANR applications. It should be appreciated that each audio capture sensor can be configured to obtain or pickup sound energy via air conduction and/or via bone conduction (through one or more bones of the user's body, e.g., the user's head or jaw). It should also be appreciated that two or more audio capture sensors of the second set of audio capture sensors 142 can be arranged such that beamforming techniques, using one or more algorithms, can be utilized to enhance the quality of the audio pickup obtained by the audio capture sensors, e.g., to enhance the quality of voice data 164 (discussed below). In some implementations, multiple of the same type of audio capture sensor are included on a wearable device, such as where there are two external facing microphones for audio capture sensors 142A and 142B on second wearable device 102B. In some implementations, a mix of different types of audio capture sensors are in included on a wearable device, such as where first audio capture sensor 142A is an external facing microphone and second audio capture sensor 142B is an accelerometer.

As will be discussed below, each audio capture sensor of the second set of audio capture sensors 142 is configured to obtain sound energy from the environment surrounding the user and convert that sound energy into an electronic signal, i.e., second signal 144. Once obtained, second signal 144 can be analyzed to determine a second energy level 146. Second energy level 146 is intended to be a measure of the total acoustic energy detected by at least one audio capture sensor 142. This total acoustic energy can include acoustic energy generated by the user, e.g., the user's voice, as well as other ambient acoustic energy from the surrounding environment, e.g., wind, conversations, traffic noise, machinery, etc. In some examples where the second set of audio capture sensors 142 includes two or more audio capture sensors, as described above, second energy level 146, can be an average energy level, i.e., second average energy level 148, obtained or picked up by all of the audio capture sensors of the second set of audio capture sensors 142. For example, one or more external microphone signals may be averaged together to form second energy level 146. In another example, one or more internal microphone signals may be averaged with one or more external microphones to form second energy level 146.

Figure 3:
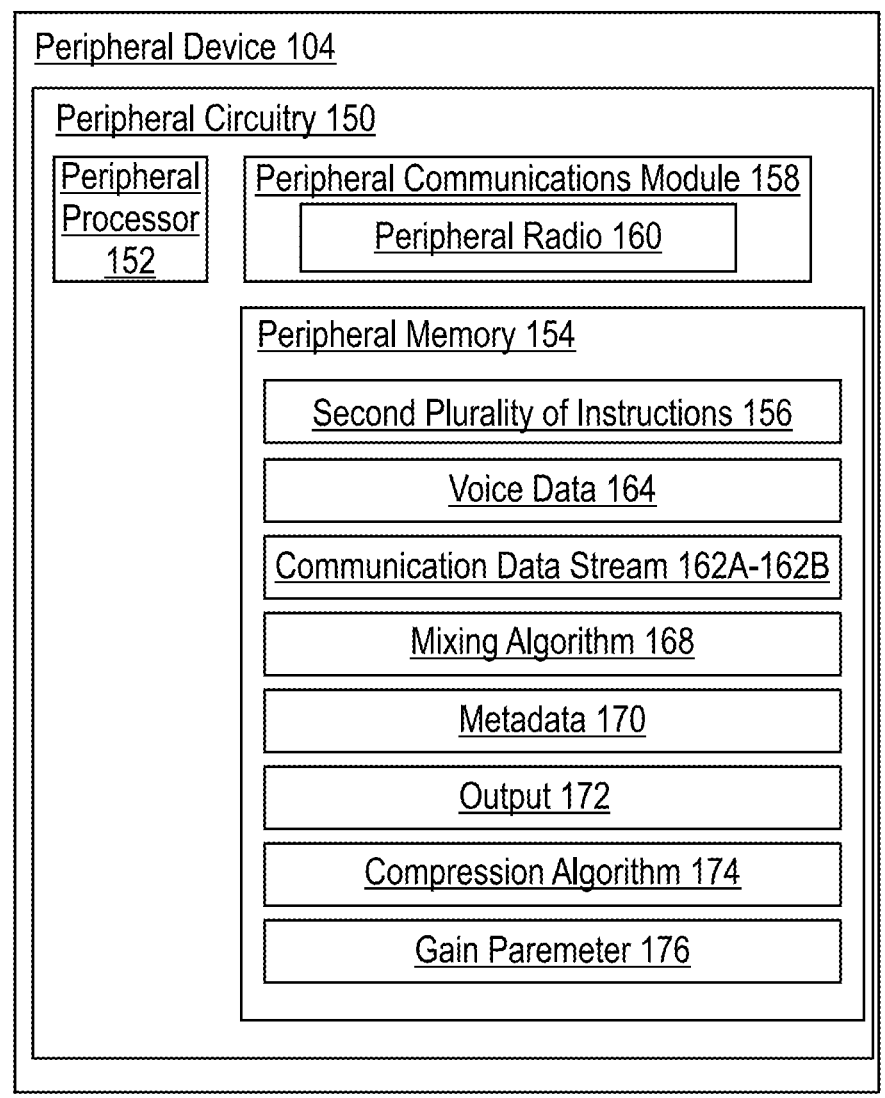
FIG. 3 is a schematic view of the components of a peripheral device according to the present disclosure.

As illustrated in FIG. 3, system 100 further includes peripheral device 104. Peripheral device 104 is intended to be a wired or wireless device capable of sending and/or receiving data related to the plurality of communication data streams 162A-162B to at least one wearable device, e.g., first wearable device 102A and/or second wearable device 102B. In one example, as illustrated in FIG. 1, peripheral device 104 is a smartphone capable of sending data from plurality of data streams 162A-162B to first wearable device 102A and/or second wearable device 102B. Although not illustrated, it should be appreciated that peripheral device 104 can also be selected from at least one of: a personal computer, a mobile computing device, a tablet, a smart speaker, a smart speaker system, a smart hub, a smart television, or any other device capable of sending or receiving data from plurality of data streams 162A-162B (discussed below). In some examples, peripheral device 104 is a remote device that is wirelessly paired with first wearable device 102A and/or second wearable device 102B. Accordingly, peripheral device 104 can comprise peripheral circuitry 150. Peripheral circuitry 150 includes peripheral processor 152 and peripheral memory 154 configured to execute and store, respectively, a plurality of non-transitory computer-readable instructions, e.g., peripheral instructions 156, to perform the various functions of peripheral device 104 and peripheral circuitry 150 as will be described herein. Peripheral circuitry 150 also includes a peripheral communications module 158 configured to send and/or receive wireless data, e.g., data relating to the plurality of data streams 162A-162B (discussed below) to and from wearable devices 102. To that end, peripheral communications module 158 can include at least one radio or antenna, e.g., a peripheral radio 160 capable of sending and receiving wireless data. In some examples, peripheral communications module 158 can include, in addition to at least one radio (e.g., peripheral radio 160), some form of automated gain control (AGC), a modulator and/or demodulator, and potentially a discrete processor for bit-processing that are electrically connected to peripheral processor 152 and peripheral memory 154 to aid in sending and/or receiving wireless data. Additionally, peripheral device 104 can include, within the set of non-transitory computer-readable instructions, one or more applications, e.g., a mobile application capable of interacting with and communicating with each wearable device within the system, i.e., at least first wearable device 102A and second wearable device 102B.

Each device of system 100, i.e., each wearable device 102 and peripheral device 104 may use their respective communication modules to establish communication data streams between each device. For example, as illustrated in FIG. 1, system 100 can be configured to establish a first communication data stream 162A between first wearable device 102A and peripheral device 104, establish a second communication data stream 162B between second wearable device 102B and peripheral device 104, and establish a third communication data stream 162C between first wearable device 102A and second wearable device 102B. Each communication data stream, i.e., first communication data stream 162A, second communication data stream 162B, and third communication data stream 162C (collectively referred to as "communication data streams 162", "plurality of communication data streams 162") can utilize various wireless data protocols or methods of transmission e.g., Bluetooth Protocols, Bluetooth Classic Protocols, Bluetooth Low-Energy Protocols, LE Audio protocols, Asynchronous Connection-Oriented logical transport (ACL) protocols, Radio Frequency (RF) communication protocols, WiFi protocols, Near-Field Magnetic Inductance (NFMI) communications, LE Asynchronous Connection (LE ACL) logical transport protocols, or any other method of transmission of wireless data suitable for sending and/or receiving audio and voice data streams. In one example, the plurality of communication data streams 162 can utilize at least one negotiated isochronous data stream, e.g., a broadcast isochronous stream and/or one or more connected isochronous streams of LE Audio protocols and may also utilize the LC3 audio codec. In other examples, third communication data stream 162C established between first wearable device 102A and second wearable audio device 102B utilizes an asynchronous connection-oriented (ACL) logical transport protocol; however, it should be appreciated that the third communication data stream 162C can be a broadcast isochronous stream or a connected isochronous stream between first wearable device 102A and second wearable device 102B. It should be appreciated that each communication data stream of plurality of communication data streams 162 can include a communication stream that utilizes at least one of the protocols listed above in any conceivable combination.

Additionally, each device of system 100 can be paired to at least one other device within the system. In one example, first wearable device 102A and second wearable device 102B are paired audio devices, e.g., paired truly wireless earbuds or paired speakers. As used herein, the term "paired", along with its ordinary meaning to those with skill in the art, is intended to mean, establishing a data connection between two devices based on a known relationship and/or identity of the devices. The devices may initially exchange credentials, e.g., a Bluetooth passkey, between each other, and establish a connection between the two devices that share the passkey. The exchange of credentials can take place in a special pairing mode of the two devices to indicate ownership of both devices and/or the intent to pair. Once the devices are paired, they are capable of establishing future connections based on the shared passkey and/or the known identity of the devices. Similarly, one or more of the wearable devices 102 can be paired with peripheral device 104 to aid in establishing the first and second communication data streams 162A-162B discussed above.

During operation, a user of system 100 may engage in various actions, activities, or applications, which include or require the capture of audio data from the environment surrounding the user through one or more of the first set of audio capture sensors 120 and/or one or more of the second set of audio capture sensors 142. As discussed above, the audio data captured by the one or more audio capture sensors of the first or second sets of audio capture sensors 120, 142 represents the electronic signals obtained by the one or more audio capture sensors and includes acoustic energy generated from sources such as ambient acoustic energy from the surrounding environment, e.g., wind, conversations, traffic noise, machinery, etc. The audio data can also include voice data, i.e., voice data 164. Voice data 164 refers to the portion of acoustic energy obtained or picked up from the user's speech, e.g., vocalized acoustic energy from the user. Therefore, it should be appreciated that the audio data includes not only ambient acoustic energy from the noises occurring in the surrounding environment of the user, but also the acoustic energy generated by the user while speaking, i.e., voice data 164. Thus, as outlined herein, the signals, energy levels, and average energy levels discussed above can include energy corresponding to ambient acoustic energy as well as acoustic energy from the user's speech, i.e., voice data 164. For example, first signal 122 and first energy level 124 associated with the acoustic energy picked up from at least one audio capture sensor of the first set of audio capture sensors 120, and first average energy level 126 associated with the acoustic energy averaged between two or more audio capture sensors of the first set of audio capture sensors 120, can include energy attributable to ambient acoustic sources and human speech. Similarly, second signal 144 and second energy level 146 associated with the acoustic energy picked up from at least one audio capture sensor of the second set of audio capture sensors 142, and second average energy level 148 associated with the acoustic energy averaged between two or more audio capture sensors of the second set of audio capture sensors 142, can include energy attributable to ambient acoustic sources and human speech.

In some applications, the ambient noise surrounding the user will not be omnidirectional or symmetrical, e.g., significantly more ambient noise may be received proximate to the user's right ear than at the user's left ear. This can be caused by a number of factors including wind directed at the user's right ear (which typically results in less wind passing the user's left ear as the user's head blocks the direct wind energy). This could also be caused by the user's orientation proximate to loud objects, vehicles, machines, people, etc. In these applications and circumstances, the systems and methods of the present application are configured to compare the first signal 122 (representing the total energy proximate the right ear) with the second signal 144 (representing the total energy proximate the left ear). When the comparison of these two signals results in one signal having a greater energy level (i.e., louder) than the other, the additional acoustic energy of the higher signal can be attributed to excessive ambient noise. For example, while the user is speaking, the first wearable device 102A (e.g., in the user's right ear) and the second wearable device 102B (e.g., in the user's left ear) are both equal-distant from the user's mouth. Thus, the amount of acoustic energy obtained by the audio capture sensors of the first set of audio capture sensors 120 of the first wearable device 102A that is attributable to voice data 164 and the amount of acoustic energy obtained by the audio capture sensors of the second set of audio capture sensors 142 of the second wearable device 102B that is attributable to voice data 164 are substantially equal. Thus, any difference or disparity between the first signal 122 and the second signal 144 is solely attributable to a difference or disparity in the ambient noise directed to the respective wearable device 102 that has the higher (or louder) signal. In other words, the signal generated by the wearable device 102 with less total energy has a higher signal-to-noise ratio and the signal generated by the wearable device 102 with more total energy has a lower signal-to-noise ratio. Therefore, when choosing or selecting an audio capture device to be responsible for obtaining voice data 164 for different applications, e.g., for voice pick up for a telephone call, the present systems and methods choose or select the audio capture sensor for voice data pickup from based on which audio capture sensor is generating the lowest energy level (quietest) signal and therefore has the higher signal-to-noise ratio. It should be appreciated that the first signal 122 and the second signal 144, used in the comparisons below, can be normalized, e.g., can account for any automated gain control parameters or settings applied to the first signal 122 or the second signal 144. In other words, any automated gain control settings applied to first signal 122 or second signal 144 can be taken into account when comparing first energy level 124 and second energy level 146. Conversely, the comparisons discussed herein can also compare the first signal 122 and the second signal 144 to determine whether the first energy level 124 is greater than or less than the second energy level 146 based on raw sensor data prior to any processing, e.g., without taking into account any automated gain control settings applied to the first signal 122 or second signal 144.

During operation as illustrated in FIG. 4A, the user of system 100 is positioned such that wind approaches the user's right side, i.e., directed toward first wearable device 102A in the user's right ear. In this example, first wearable device 102A is configured to obtain a first signal 122 associated with first energy level 124 via at least one audio capture sensor 120 or obtain first signal 122 associated with a first average energy level 126 representing the average energy level of two or more audio capture sensors of the first set of audio capture sensors 120, and store first signal 122, first energy level 124, and/or first average energy level 126 in its own memory (i.e., first memory 110) or send first signal 122 to peripheral device 104 via first commination data stream 162A where peripheral device 104 is configured to determine first energy level 124 and/or first average energy level 126. Also within this example, second wearable device 102B is configured to obtain a second signal 144 associated with second energy level 146 of at least one audio capture sensor 142 or obtain second signal 144 associated with a second average energy level 148 representing an average energy level of two or more audio capture sensors of the second set of audio capture sensors 142, and store second signal 144, second energy level 146, and/or second average energy level 148 in its own memory (i.e., second memory 132) or send second signal 144 to peripheral device 104 via second commination data stream 162B where peripheral device 104 is configured to determine second energy level 146 and/or second average energy level 148. Upon a determination that the first signal 122 has a lower energy level that the second signal 144, e.g., where the first energy level 124 is less than second energy level 146 (caused by, for example, wind increasing the total energy in the audio capture sensors of the second set of audio capture sensors 142), and thus has a higher signal-to-noise ratio, system 100 can assign the first wearable device 102A the role of primary voice capture device 166. Once assigned the primary voice capture device role 166, the first wearable device 102A can utilize one or more audio capture sensors of the first set of audio capture sensors 120 to obtain the voice data 164 (e.g., to obtain or pickup and record the user's speech) and process and/or send the voice data 164 so that it may be used with one or more applications executable on peripheral device 104, e.g., for use in a telephone call.

In the alternative, as illustrated in FIG. 4B, the user of system may be positioned such that wind approaches the user's left side, i.e., directed toward second wearable device 102B in the user's left ear. As discussed above, first signal 122 and second signal 144 are obtained by the respective audio capture sensors of each device and are compared. Upon a determination that the first signal 122 has a higher energy level than the second signal 144, e.g., where the first energy level 124 is greater than second energy level 146 (caused by, for example, wind increasing the total energy in the audio capture sensors of the first set of audio capture sensors 120), and thus has a lower signal-to-noise ratio, system 100 can assign the second wearable device 102B the role of primary voice capture device 166. Second wearable device 102B, once assigned the primary voice capture device role 166, can utilize one or more audio capture sensors of the second set of audio capture sensors 142 to obtain the voice data 164 (e.g., to obtain or pickup and record the user's speech) and process and/or send the voice data 164 so that it may be used with one or more applications executable on peripheral device 104, e.g., for use in a telephone call.

Once selected, the primary voice capture device 166 is responsible for compressing, encoding and sending voice data 164, obtained from the respective audio capture sensors of the first and second sets of audio capture sensors outlined above, to peripheral device 104 for decoding, mixing, and/or use in one or more applications executed on the peripheral device 104. In other words, the primary voice capture device 166 is responsible for collecting or obtaining the voice data 164 for both wearable devices 102 and will send voice data 164 to peripheral device 104 for use in one or more applications. As such, should first wearable device 102A be selected as the primary audio capture device 166, second wearable device 102B can utilize third communications data stream 162C to send audio data and voice data 164 to first wearable device 102A for forwarding to peripheral device 104. Similarly, should second wearable device 102B be selected as the primary audio capture device 166, first wearable device 102A can utilize third communications data stream 162C to send audio data and voice data 164 to second wearable device 102B for forwarding to peripheral device 104.

In the event that multiple audio capture sensors are used (e.g., two or more audio capture sensors of a particular set of audio capture sensors) to obtain voice data 164, it may be necessary to mix the voice data 164 obtained by the two or more audio capture sensors prior to sending the voice data 164 to peripheral device 104. To that end, each device of system 100, i.e., first wearable device 102A, second wearable device 102B and peripheral device 104, can each store and execute, on their respective memories and processors, a mixing algorithm 168. The mixing algorithm 168 can be utilized to combine or mix the audio inputs of the two or more audio capture sensors on the selected primary voice capture device 166 so such that it can be outputted, sent, or utilized by the one or more applications executed on the peripheral device 104. It should be appreciated that the mixing algorithm can also include or utilize beamforming techniques for the inputs from the two or more audio capture sensors to enhance the quality of the voice data 164 utilized. It should also be appreciated that, in the alternative to mixing the audio data from two or more audio capture sensors within the circuitry of the selected primary voice capture device 166, the primary voice capture device 166 can simply compress and send the audio data captured by each audio capture sensor to peripheral device 104 for mixing by peripheral device 104. Metadata 170 may be utilized by the primary voice capture device 166 (i.e., either first wearable device 102A or second wearable device 102B) when mixing the audio data captured by the two or more audio capture sensors of the respective device selected as the primary voice capture device 166. For example, metadata 170 may include the type of audio capture sensor (e.g., whether it is an internal microphone or external microphone) and aid in how much or how little of a given signal is added or suppressed from the final output. In one example, the audio data from two or more audio capture sensors is sent to peripheral device 104 for mixing using mixing algorithm 168. In this example, the mixing algorithm 168 is configured to generate an output 172 which can include or be influenced by metadata 170. Peripheral device 104 can be configured to send the output 172 to one or more of the wearable devices 102 and the output 172 can be used to automatically adjust a gain parameter 176 (discussed below), a volume level, or an active noise reduction level used by the wearable devices 102. The output 172 of the aforementioned mixing algorithm 168 can be used to make decisions regarding the volume level or ANR settings of the wearable devices. For instance, based on the noise levels detected by the microphone mixing algorithm 168 running on the peripheral device 104, a signal could be sent to the wearable devices 102 telling it to adjust the volume level to compensate for environmental noise. Similarly, information about environmental noise could be sent as a signal back to the wearable devices 102 in order to automatically adjust ANR levels. As will be discussed below, the automatic adjustment of each of these parameters may be dependent on a switch of roles between the first wearable device 102A and the second wearable device 102B, e.g., a switch in which device is the primary voice capture device 166.

It should be appreciated that, in the analysis of which wearable device 102 is assigned the role of primary voice capture device 166, the audio capture sensors used can be any conceivable combination of the audio capture sensors listed above. For example, should first wearable device 102A be selected as the primary voice capture device 166, first set of audio capture sensors 120 can include first audio capture sensor 120A and second audio capture sensor 120B, where first audio capture sensor 120A is an external feedforward microphone and where second audio capture sensor 120B is an internal feedback microphone. In this example, metadata 170 of each audio capture sensor can identify that the signal produced or obtained by first audio capture sensor 120A is an external microphone and the signal produced or obtained by second audio capture sensor 120B is an internal microphone, and mixing algorithm 168 may choose to weight the audio captured by the external feedforward microphone should be weighed more heavily in the mixing process than the internal feedback microphone to produce an output with higher fidelity. In some examples, the primary voice capture device 166 may use one audio capture sensor from the first set of audio capture sensors 120 and one audio capture sensor from the second set of audio capture sensors 142. For example, should first wearable device 102A be selected as the primary voice capture device 166, first set of audio capture sensors 120 can include first audio capture sensor 120A and second audio capture sensor 120B, where first audio capture sensor 120A is an external feedforward microphone and where second audio capture sensor 120B is an internal feedback microphone. Additionally, the second set of audio capture sensors 142 of the second wearable device 102B can include a first audio capture sensor 142A and a second audio capture sensor 142B where the first audio capture sensor 142A is an external feedforward microphone and where second audio capture sensor 142B is an internal feedback microphone. In this example, as first wearable device 102A is selected as the primary audio capture device, audio data captured from the first audio capture sensor 142A and/or second audio capture sensor 142B of the second set of audio capture sensors 142 of the second wearable device 102B can be sent to first wearable device 102A via third communication data stream 162C so that the mixing algorithm 168 can utilize at least one audio capture sensor from the first set of audio capture sensors 120 and at least one audio capture sensor of the second set of audio capture sensors 142.

Additionally, to aid in the sending of audio data from two or more audio capture sensors to another device within system 100, each device can also utilize a compression algorithm 174. The compression algorithm used may be a conventional compression algorithm designed for audio compression, e.g., low-complexity subband codec (SBC), LC3 codec, advanced audio coding (AAC), or LDAC codecs, or may be a non-conventional compression algorithm, e.g., OGG, MP3, M4A, etc. The compression algorithm 174 may use any of the foregoing compression codecs or formats when compressing and sending audio data from one device to another device within the system, i.e., through communication data streams 162A-162C.

During operation, the selection of primary voice capture device 166 or switching the role of primary voice capture device 166 can be a dynamic process. For example, in real-time, the first wearable device 102A and the second wearable device 102B can utilize one or more algorithms to periodically, or continuously, obtain audio data captured from each of the audio capture sensors of the first set of audio capture sensors 120 and each audio capture second of the second audio capture sensors 142 and determine whether first signal 122 or second signal 144 has a greater energy level, i.e., whether first energy level 124 or second energy level 146 is greater. Therefore, the selection of the audio capture sensors used to obtain voice data 164 and send voice data 164 to peripheral device for use with one or more applications is also dynamic.

In one example, during operation system 100 can dynamically perform a switch of the primary voice capture device 155 from one wearable device 102 to the other where the peripheral device 104 is aware of the switch, where the communication data streams being used utilize classic Bluetooth communication protocols. For example, system 100 can be configured such that first communication data stream 162A between peripheral device 104 and first wearable device 102A and second communication data stream 162B between peripheral device 104 and second wearable device 102B are classic Bluetooth data streams. In this example, one of the wearable device 102 is responsible for obtaining voice data 164 and sending it to peripheral device 104 for use with one or more applications. Should the signal-to-noise ratio of the primary voice capture device 166 be too low and require a voice data 164 to be obtained from the other device, i.e., not the primary voice capture device. It is not desirable to obtain the voice data from the other wearable device 102, send the voice data 164 from the other wearable device 102 to the primary voice capture device 166 via third communication data stream 162C, and then send the voice data to peripheral device via the first communication data stream 162A. The total latency of this relay of voice data 164 is too high and would result in diminishing user experience. Thus, a role switch of the primary voice capture device 166 is needed. For example, one of the wearable devices 102, i.e., the primary voice capture device 166 is initially responsible for receiving voice data 164 and sending the voice data 164 to the peripheral device for use with one or more applications. Additionally, in this example, the primary voice capture device 166 can be responsible for receiving any playback audio data to playback in both wearable devices 102 and for sending the playback audio data to the other wearable device 102. In other words, the other wearable device 102 sends and receives all audio data to the peripheral device 104 via a separate connection with the primary voice capture device 166, e.g., over third communication data stream 162C. In the event that the role of primary voice capture device 166 is switched from, for example, first wearable device 102A to second wearable device 102B, the responsibility of sending the voice data 164 to peripheral device 104 also switches. In this example, once the determination is made to switch the role of primary voice capture device 166 from first wearable device 102A to second wearable device 102B (e.g., when the second energy level 146 is less than first energy level 124), a request can be sent to the peripheral device 104 requesting that the peripheral device 104 acknowledge that a role switch is about to occur. Upon receiving the response to the request from the peripheral device 104, the first and second wearable devices 102 can perform a handshake and initiate a switch of the role of primary voice capture device 166 from first wearable device 102A to second wearable device 102B. Thus, second wearable device 102B becomes the new primary voice capture device 166 and is responsible for relaying all audio data to and from first wearable device 102A to peripheral device 104 and is responsible for sending voice data 164 to peripheral device 104 for use with one or more applications.

In another example, during operation system 100 can dynamically perform a switch of the primary voice capture device role 166 from one wearable device 102 to the other where the peripheral device is aware of the switch, and where the communication data streams being used utilize negotiated isochronous data streams. For example, system 100 can be configured such that first communication data stream 162A between peripheral device 104 and first wearable device 102A and second communication data stream 162B between peripheral device 104 and second wearable device 102B are negotiated connected isochronous streams. Thus, peripheral device 104 is configured to send data streams specific to each wearable device 102 to each wearable device 102. In other examples, there may only be one communication data stream, e.g., first communication data stream 162A between the peripheral device 104 and the wearable device 102, i.e., where the first communication data stream 162A is a broadcast isochronous stream. Thus, peripheral device 104 is configured to send a single stream of data where portions of the stream are specific to first wearable device 102A and portions of the stream are specific to wearable device 102B. In either of these examples, peripheral device 104 is initially configured to receive the voice data 164 from the selected primary voice capture device 166, e.g., first wearable device 102A. In the event that the role of primary voice capture device 166 is switched from first wearable device 102A to second wearable device 102B, the responsibility of sending the voice data 164 from both wearable devices 102 can also switch. In this example, once the determination is made to switch the role of primary voice capture device 166 from first wearable device 102A to second wearable device 102B (e.g., when the second energy level 146 is less than first energy level 124), a request can be sent to the peripheral device 104 requesting that the peripheral device 104 acknowledge that a role switch is about to occur. Upon receiving the response to the request from the peripheral device 104, the first and second wearable devices 102 can perform a handshake and initiate a switch of the role of primary voice capture device 166 from first wearable device 102A to second wearable device 102B. In other words, the peripheral device 104 is configured to know that the switch is occurring or is about to occur and will adjust its radio accordingly, e.g., peripheral radio 160, for example by adjusting the time periods when it is expecting to receive voice data packets from the new primary voice capture device 166.

Alternatively, the dynamic selection process for selection of the primary voice capture device 166 can be achieved without informing or alerting the peripheral device 104, e.g., without the peripheral device "knowing" a switch is about to occur or is occurring. For example, the determination to switch the role of primary voice capture device 166 from one wearable device 102 to the other is made within or between the two wearable device 102 mid-stream, e.g., through the third communications data stream 162C, without providing any indication or request to peripheral device 104 that a switch is occurring. In this example, the wearable devices switch roles entirely, i.e., the first wearable device 102A will receive and acknowledge data packets (assuming a connected isochronous stream) originally designated for second wearable device 102B and second wearable device 102B will receive and acknowledge packets (assuming a connected isochronous stream) originally designated for first wearable device 102A such that the peripheral device 104 does not recognize that a change occurred. If single broadcast isochronous stream from the peripheral device 104 to wearable device 102 is used, each device simply receives the packets originally designated for the other device without either device acknowledging receipt of any packets.

To aid in switching roles each device may exchange access codes specific for granting access to the specific portions of a given data stream that are designated for each device. For example, in the event the devices of system 100 utilize connected isochronous data streams, e.g., where one or more of communication data streams 162A-162C are connected isochronous data streams, first wearable device 102A can utilize a first access code to authenticate or access and allow use of data provided by peripheral device 104 within first communication data stream 162A. Similarly, second wearable device 102B can utilize a second access code to authenticate or access and allow use of data provided by peripheral device 104 within second communication data stream 162B. Prior to any role switch occurring between first wearable device 102A and second wearable device 102B, these devices may exchange the first and second access codes through third communication data stream 162C such that after the role switch occurs each device can seamlessly receive and access the packets of the new data stream, e.g., after the switch, first wearable device 102A will be able to access, receive and acknowledge packets sent within second communications data stream 162B and second wearable device 102B will be able to access, receive and acknowledge packets sent within first communications data stream 162A.

In one example, a gain parameters 176, a volume setting and/or an active noise reduction (ANR) setting for each wearable device 102 can also be exchanged between first wearable device 102A and second wearable device 102B prior to switching roles. Gain parameter 176 is intended to be a setting or value representing the gain applied to a particular signal, e.g., first signal 122 or second signal 144 related to voice data 164 or the gain applied to the other audio data sent or received from peripheral device 104, e.g., the other speaker's voice in a telephone conversation with the user or other media inputs. By exchanging these parameters and settings, once a role switch is effected from, e.g., first wearable device 102A to second wearable device 102B, the new primary voice capture device 166 (e.g. second wearable device 102B) can apply the same gain parameter 176, volume settings, and/or ANR settings used by first wearable device 102A such that the users of the system do not perceive a change or discontinuity in voice playback or audio playback once the switch takes effect.

Figure 5:
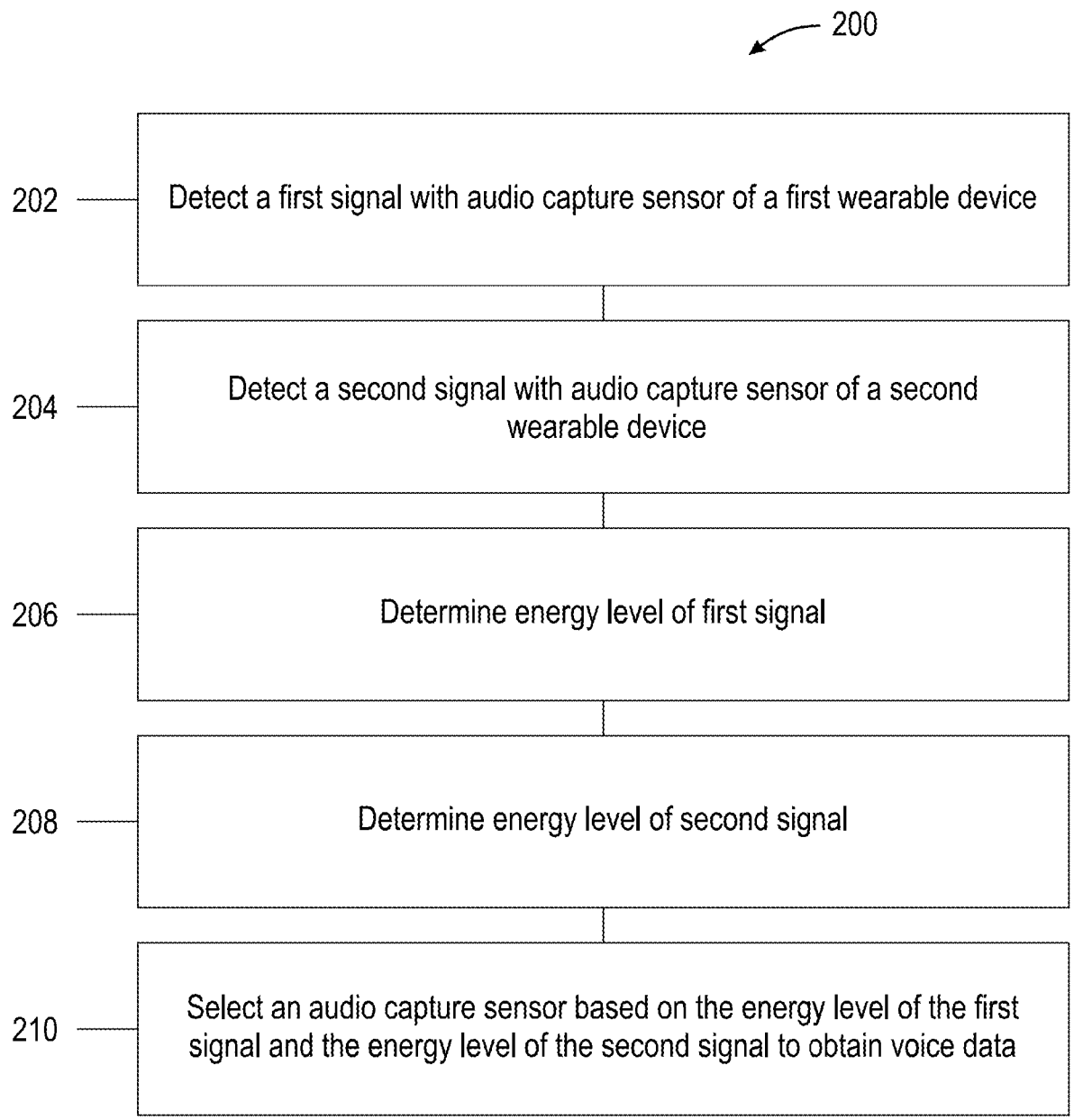
FIG. 5 is a flow chart illustrating the steps of a method according to the present disclosure.

FIG. 5 illustrates a flow chart corresponding to method 200 according to the present disclosure. As shown, method 200 can include, for example: detecting a first signal 122 corresponding with a user's voice using at least one audio capture sensor 120A of a first wearable device 102A (step 202); detecting a second signal 144 corresponding with the user's voice using at least one audio capture sensor 142A of a second wearable device 102B, wherein the second wearable device 102B is wirelessly connected to the first wearable device 102A (step 204); determining an energy level 124 of the first signal 122 (step 206); determining an energy level 146 of the second signal 144 (step 208); and selecting, based at least in part on the energy level 124 of the first signal 122 and the energy level 146 of the second signal 144, at least one audio capture sensor (120A, 120B) of the first wearable device 102A and/or at least one audio capture sensor (142A, 142B) of the second wearable device 102B to obtain voice data 164 (step 210).

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for selecting one or more audio capture sensors of wearable devices, the method comprising:
   detecting a first signal corresponding with a user's voice using at least one audio capture sensor of a first wearable device;
   detecting a second signal corresponding with the user's voice using at least one audio capture sensor of a second wearable device, wherein the second wearable device is wirelessly connected to the first wearable device;
   determining an energy level of the first signal;
   determining an energy level of the second signal;
   selecting, based at least in part on a comparison of the energy level of the first signal and the energy level of the second signal, at least one audio capture sensor of the first wearable device and/or at least one audio capture sensor of the second wearable device to obtain voice data; and
   transmitting, via the first wearable device, when the selecting causes a change from using the at least one audio capture sensor of the first wearable device to obtain voice data to using the at least one audio capture sensor of the second wearable device to obtain voice data, an acknowledgment request to a peripheral device requesting acknowledgment that the change is about to occur.

2. The method of claim 1, wherein the first wearable device is configured to send the first signal to a peripheral device and the second wearable device is configured to send the second signal to a peripheral device, and wherein the peripheral device is configured to compare the energy level of the first signal with the energy level of the second signal for the selecting of the at least one audio capture sensor of the first wearable device and/or the at least one audio capture sensor of the second wearable device to obtain voice data.

3. The method of claim 2, wherein the at least one audio capture sensor of the first wearable device comprises a first set of multiple audio capture sensors, and wherein the first signal is an average energy level of the first multiple audio capture sensors, and wherein the first wearable device is configured to send the first signal to the peripheral device using a compression algorithm.

4. The method of claim 2, wherein the first wearable device is further configured to send metadata to the first peripheral device for use with a mixing algorithm executed by the peripheral device.

5. The method of claim 4, wherein the mixing algorithm is arranged to generate an output, and wherein the peripheral device is configured to send the output to the first wearable device, wherein the first wearable audio device is configured to use the output to automatically change a volume level or an active noise reduction (ANR) setting.

6. The method of claim 1, wherein the second wearable device is configured to send the second signal to the first wearable device, and wherein the first wearable device is configured to compare the energy level of the first signal with the energy level of the second signal for the selecting of the at least one audio capture sensor of the first wearable device and/or the at least one audio capture sensor of the second wearable device to obtain voice data.

7. The method of claim 1, wherein the energy levels of the first and second signals relate to at least one of signal-to-noise ratio (SNR), wind presence, radio frequency (RF) performance, or audio pickup.

8. The method of claim 1, wherein the at least one audio capture sensor of the first wearable device and the at least one audio capture sensor of the second wearable device are selected from at least one of an exterior microphone, an interior microphone, a feedback microphone that is also used for acoustic noise reduction (ANR) purposes, a feedforward microphone that is also used for ANR purposes, or an accelerometer.

9. The method of claim 1, wherein the at least one audio capture sensor of the first wearable device includes a first set of multiple audio capture sensors, and wherein the selecting of the at least one audio capture sensor includes dynamically changing between selection of a first audio capture sensor of the first set of multiple audio capture sensors and a second audio capture sensor of the first set of multiple audio capture sensors.

10. The method of claim 1, wherein the at least one audio capture sensor of the first wearable device includes a first set of multiple audio capture sensors, and wherein the energy level of the first signal is an average energy level of the first set of multiple audio capture sensors.

11. The method of claim 10, wherein the at least one audio capture sensor of the second wearable device includes a second set of multiple audio capture sensors, and wherein the energy level of the second signal is an average energy level of the second set of multiple audio capture sensors.

12. The method of claim 1, wherein when the energy level of the first signal is less than the energy level of the second signal, only the at least one audio capture sensor of the first wearable device is selected to obtain voice data and not the at least one audio capture sensor of the second wearable device.

13. The method of claim 1, wherein the voice data is sent to a peripheral device using a negotiated connected isochronous stream.

14. The method of claim 13, wherein when the selecting causes a change from using the at least one audio capture sensor of the first wearable device to obtain voice data to using the at least one audio capture sensor of the second wearable device to obtain voice data, the first wearable device performs a handshake with the second wearable device to shift responsibility to obtain voice data to the at least one audio capture sensor of the second wearable device.

15. The method of claim 1, wherein when the selecting causes a change from using the at least one audio capture sensor of the first wearable device to obtain voice data to using the at least one audio capture sensor of the second wearable device to obtain voice data, a gain parameter associated with the at least one audio capture sensor of the first wearable device is shared with the second wearable device to be applied to the at least one audio capture sensor of the second wearable device.

16. A computer program product for selecting one or more audio capture sensors of wearable devices, the computer program product comprising a set of non-transitory computer readable instructions that when executed on at least one processor of a first wearable device, a second wearable device, or a peripheral device, the processor is configured to:

detect or receive a first signal corresponding with a user's voice captured by at least one audio capture sensor of the first wearable device;

detect or receive a second signal corresponding with the user's voice captured by at least one audio capture sensor of the second wearable device, wherein the second wearable device is wirelessly connected to the first wearable device;

determine an energy level of the first signal;

determine an energy level of the second signal; and select, based at least in part on the energy level of the first signal and the energy level of the second signal, at least one audio capture sensor of the first wearable device or at least one audio capture sensor of the second wearable device to obtain voice data, wherein the voice data corresponds to the user;

transmit, via the first wearable device, when the selecting causes a change from using the at least one audio capture sensor of the first wearable device to obtain voice data to using the at least one audio capture sensor of the second wearable device to obtain voice data, an acknowledgment request to a peripheral device requesting acknowledgment that the change is about to occur.

17. The computer program product of claim 16, wherein the first wearable device is configured to send the first signal to the peripheral device and the second wearable device is configured to send the second signal to the peripheral device, and wherein the peripheral device is configured to compare the energy level of the first signal with the energy level of the second signal for selecting of the at least one audio capture sensor of the first wearable device or the at least one audio capture sensor of the second wearable device to obtain voice data.

18. The computer program product of claim 16, wherein the second wearable device is configured to send the second signal to the first wearable device, and wherein the first wearable device is configured to compare the energy level of the first signal with the energy level of the second signal for the selecting of the at least one audio capture sensor of the first wearable device or the at least one audio capture sensor of the second wearable device to obtain voice data.

19. The computer program product of claim 16, wherein the energy levels of the first and second signals related to at least one of signal-to-noise ratio (SNR), wind presence, radio frequency (RF) performance, or audio pickup.

20. The computer program product of claim 16, wherein the at least one audio capture sensor of the first wearable device and the at least one audio capture sensor of the second wearable device are selected from at least one of: an exterior microphone, an interior microphone, a feedback microphone that is also used for acoustic noise reduction (ANR) purposes, a feedforward microphone that is also used for ANR purposes, or an accelerometer.

21. The computer program product of claim 16, wherein the at least one audio capture sensor of the first wireless worn device includes a first set of multiple audio capture sensors and wherein the energy level of the first signal is an average energy level of the first set of multiple audio capture sensors; and the at least one audio capture sensor of the second wearable device includes a second set of multiple audio capture sensors, and wherein the energy level of the second signal is an average energy level of the second set of audio capture sensors.

22. The computer program product of claim 16, wherein when the energy level of the first signal is less than the energy level of the second signal, only the at least one audio capture sensor of the first wearable device is selected to obtain voice data and not the at least one audio capture sensor of the second wearable device.

23. The computer program product of claim 16, wherein the selecting causes a change from using the at least one audio capture sensor of the first wearable device to obtain voice data to using the at least one audio capture sensor of the second wearable device to obtain voice data, the first wearable device performs a handshake with the second wearable device to shift responsibility to obtain voice data to the at least one audio capture sensor of the second wearable device.

24. The computer program product of claim 16, when the selecting causes a change from using the at least one audio capture sensor of the first wearable device to obtain voice data to using the at least one audio capture sensor of the second wearable device to obtain voice data, a gain parameter associated with the at least one audio capture sensor of the first wearable device is shared with the second wearable device to be applied to the at least one audio capture sensor of the second wearable device.

\* \* \* \* \*